Dec. 1, 1931.  A. B. MODINE  1,834,001
RADIATOR
Filed Nov. 19, 1926
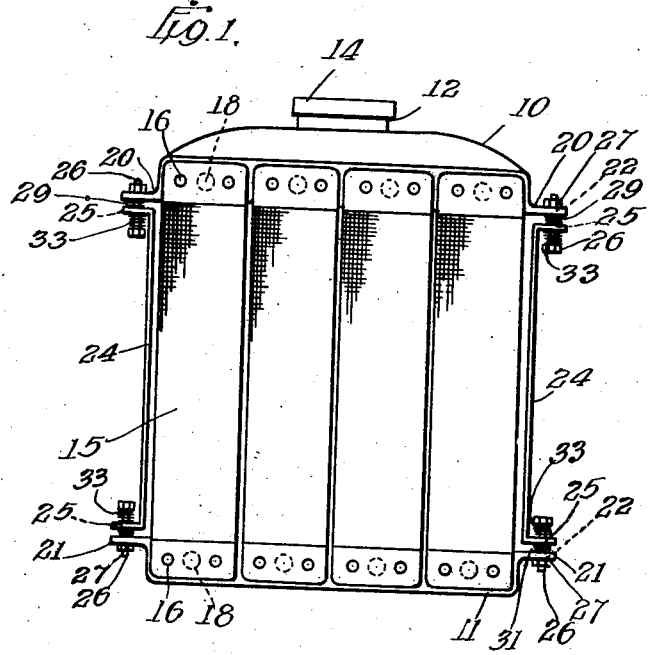
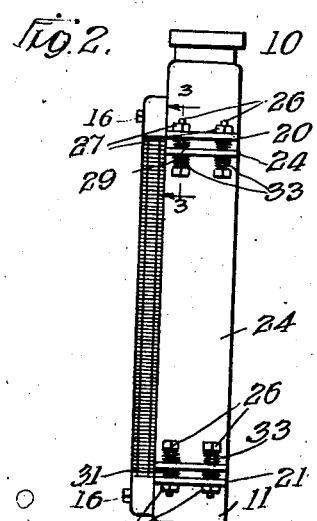
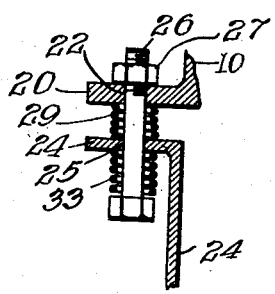
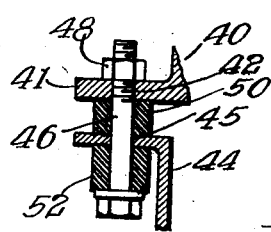
Witness:
Harry E. White
Inventor:
Arthur B. Modine
Hill & Hill
Attys Patented Dec. 1, 1931

1,834,001

UNITED STATES PATENT OFFICE

ARTHUR B. MODINE, OF RACINE, WISCONSIN, ASSIGNOR TO MODINE MANUFACTURING COMPANY, OF RACINE, WISCONSIN, A CORPORATION OF WISCONSIN

RADIATOR

Application filed November 19, 1926. Serial No. 149,363.

My invention relates to radiators and has among its other objects the provision of devices of the kind described which are compact, convenient, durable, efficient and satisfactory for use wherever found applicable.

A particular object of the invention is to provide improved radiators for the cooling systems of the internal combustion engines usually provided in automobiles.

Another particular object of the invention is to provide a radiator having improved construction whereby the radiator may contract and expand with changes in temperatures without injury thereto.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawings, wherein like reference characters indicate like or corresponding parts;

Fig. 1 is a front elevation of a radiator embodying the invention;

Fig. 2 is a side elevation of the improved radiator;

Fig. 3 is an enlarged fragmentary section taken on line 3—3 of Fig. 2; and

Fig. 4 is a fragmentary section taken through a radiator embodying another form of the invention.

In the drawings, I have shown two forms of the invention embodied in the automobile radiators of the type shown and described in my United States Letters Patent #1,433,398, dated October 24, 1922, but it is to be understood that my invention is limited to this use only to the extent indicated in the appended claims.

Referring for the present to the Figures 1 to 3 inclusive, the reference characters 10 and 11 designate the upper and lower tanks respectively of an automobile radiator, the upper tank 10 being provided with a filling tube 12 normally closed by the usual radiator cap 14. The tanks 10 and 11 may be of any suitable construction but are preferably cast. Interposed between the tanks 10 and 11 and communicating therewith are a plurality of radiator units 15 which are secured to the tanks by bolts 16 or the equivalent, the radiator units 15 communicating with the tanks 10 and 11 through openings 18 provided therein. Each radiator unit 15 preferably comprises a plurality of spaced tubes extending longitudinally thereof, through which tubes the cooling fluid may flow from the upper tank 10 to the lower tank 11 and thence to the water jacket of the internal combustion engine.

Formed integral with the tanks 10 and 11 and projecting laterally therefrom are integral lugs 20 and 21, respectively, provided with apertures 22. Interposed between each lug 20 and the lug 21 disposed directly therebelow is a bent or U-shaped bar 24 which is preferably of less length than the distance between the lug 20 and its associated lug 21. Apertures 25 provided in each bar 24 accommodate bolts 26 which also pass through the apertures 22 in the associated lugs 20 and 21. Nuts 27 provided upon the bolts 26 prevent accidental loss of the bolts from the device and may also be manipulated to secure results hereinafter described. Disposed around each bolt 26 and interposed between the associated bar 24 and lug 20 is a compression spring 29 and disposed around each bolt 26 and interposed between the associated bar 24 and lug 21 is a compression spring 31. Also disposed around each bolt 26 and interposed between its head and the bar 24 is a compression spring 33.

The above described construction permits the radiator units 15 to elongate and contract freely without injury to the radiator as a whole, but at the same time, the bent bars 24 function as reenforcing elements and prevent injury to the radiator when it is subjected to jars and vibrations. Obviously, when the temperature of the radiator units 15 rises and they elongate, such elongation is against the action of the compression spring 33 and when the radiator units cool and contract, the contraction takes place against the action of the compression springs 29 and 31. It is readily understood that the tension of the compression springs 29, 31 and 33 may be adjusted by manipulating the nuts 27.

In Fig. 4, I have shown another embodiment of the invention, the invention being embodied in a radiator which is substantially identical with that shown in Fig. 1. However, in this instance the compression springs are replaced by members formed of resilient material such as rubber. Thus, I have shown a portion of a tank 40 substantially identical with the above mentioned tank 10 and provided with lugs 41 having apertures 42 formed therethrough. The radiator comprises a plurality of bent U-shaped bars 44 which are substantially identical to the aforementioned bars 24 and are provided with apertures 45 to accommodate bolts 46 which also pass through the apertures 42 in the lugs 41. Each bolt 46 is provided with a nut 48 engageable with the upper side of the lug 41. Disposed around each bolt 46 and interposed between the bent bar 44 and the associated lug 41 is a sleeve or collar 50 preferably formed of rubber and also disposed around each bolt 46 is a sleeve or collar 52 also preferably formed of rubber, the sleeve or collar 52 being disposed between the bent bar 44 and the head of the bolt. While I have stated that the radiator comprises two bent bars 44 and that the tank 40 comprises a plurality of lugs 41, I have only shown one of the lugs and a portion of one of the bent bars as it is believed that the above description of the radiator shown in Fig. 1 will make the description of the embodiment shown in Fig. 4 readily understood. Obviously, the collars 50 and 52 function substantially in the same manner as the compression springs provided in the radiator illustrated in Figs. 1 to 3 inclusive.

In some instances, I may prefer to secure the bars 24 or 44 rigidly either to the upper or lower tanks of the radiator and yieldingly connect them to the other tank. Thus, referring to Fig. 1, the bent bars 24 could be readily secured to the lugs 27 of the tank 11 after the springs 31 and 33 had been removed therefrom. Displacement of the tank 10 relative to the tank 11 would then be compensated for by the springs 29 and 43 associated with the bolts 26 which secure the tank 10 to the bars 24.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A radiator comprising spaced tanks, tubular means extending between the tanks and communicating therewith, rigid means interposed between the tanks, means for securing said rigid means to one of said tanks, bolts for securing said rigid means to the other of said tanks, and resilient means carried by said bolts and disposed on each side of said rigid means and between said rigid means and the other of said tanks for permitting expansion and contraction of said tubular means.

2. A radiator comprising spaced tanks, tubular means extending between the tanks and communicating therewith, rigid means interposed between the tanks, means for securing said rigid means to one of said tanks, bolts for securing said rigid means to the other of said tanks, and elements formed of rubber associated with said bolts for permitting contraction and expansion of said tubular means.

3. A radiator comprising spaced tanks, each of said tanks being provided with lugs, bars interposed between said tanks and having end portions adapted to be connected to said lugs, and means including resilient means disposed on each side of said end portions for connecting said end portions to said lugs.

In testimony whereof, I have hereunto signed my name.

ARTHUR B. MODINE.